United States Patent [19]

Wiedemer

[11] Patent Number: 5,047,928
[45] Date of Patent: * Sep. 10, 1991

[54] BILLING SYSTEM FOR COMPUTER SOFTWARE

[76] Inventor: John D. Wiedemer, 930 W. Forest Dr., Houston, Tex. 77079

[*] Notice: The portion of the term of this patent subsequent to Jan. 3, 2006 has been disclaimed.

[21] Appl. No.: 292,927

[22] Filed: Jan. 3, 1989

Related U.S. Application Data

[63] Continuation-in-part of Ser. No. 922,689, Oct. 24, 1986, Pat. No. 4,796,181.

[51] Int. Cl.$^5$ .............................................. H04L 9/00
[52] U.S. Cl. ...................................... 364/406; 380/4; 364/200; 364/286.6
[58] Field of Search ........................... 235/382, 382.5; 364/406, 200 MS File; 380/4, 25

[56] References Cited

U.S. PATENT DOCUMENTS

| | | | |
|---|---|---|---|
| 3,806,882 | 4/1974 | Clarke | 364/200 X |
| 4,168,396 | 9/1979 | Best | 178/22 |
| 4,246,638 | 1/1981 | Thomas | 364/200 |
| 4,278,837 | 7/1981 | Best | 178/22 |
| 4,310,720 | 1/1982 | Check, Jr. | 178/22 |
| 4,433,207 | 2/1984 | Best | 178/22 |
| 4,446,519 | 5/1984 | Thomas | 364/300 |
| 4,447,890 | 5/1984 | Duwel et al. | 364/900 |
| 4,450,535 | 8/1984 | de Pommery et al. | 364/900 |
| 4,458,315 | 7/1984 | Uchenick | 364/200 |
| 4,462,078 | 7/1984 | Ross | 364/200 |
| 4,471,163 | 9/1984 | Donald | 178/22 |
| 4,494,114 | 1/1985 | Kaish | 340/825.31 |
| 4,504,915 | 3/1985 | Daniels et al. | 364/466 |
| 4,511,970 | 4/1985 | Okano et al. | 364/405 |
| 4,513,389 | 4/1985 | Devchoudhury | 364/900 |
| 4,562,306 | 12/1985 | Chou et al. | 178/22 |
| 4,609,777 | 7/1986 | Cargile | 178/22 |
| 4,658,093 | 4/1987 | Hellman | 380/25 |
| 4,683,553 | 7/1987 | Mollier | 380/4 |

OTHER PUBLICATIONS

PCT Publication of PCT/AU85/00016-Published Aug. 15, 1985, Inventor-Guignard.
D. H. Freeman, "Foiling Corporate Software Pirates," *High Technology*, Jul. 1985, pp. 62-64.

Primary Examiner—Jerry Smith
Assistant Examiner—Steven G. Kibby
Attorney, Agent, or Firm—Quarles & Brady

[57] ABSTRACT

A computer software security and billing system is disclosed in which the application program is enciphered in accordance with an algorithm driven by a numeric key. The user's computer is provided with a hardware security module and a removable billing module, both of which carry unique codes. A security program accesses the application program and also writes information about billing into the billing module. The billing module is periodically replaced so the user can be charged based on amount of usage of the software.

5 Claims, 2 Drawing Sheets

BILLING SYSTEM FOR COMPUTER SOFTWARE

This is a continuation-in-part of patent application Ser. No. 922,689 filed Oct. 24, 1986, now U.S. Patent No. 4,796,181.

FIELD OF THE INVENTION

The present invention relates to the field of the marketing of computer software in general, and relates, in particular, to a system for securing and/or encoding personal computer software so that it can be marketed to the ultimate user on a pay-per-usage arrangement rather than on a fixed fee purchase price.

BACKGROUND OF THE INVENTION

The personal computer industry has grown enormously in the past decade and has created a large market in software suitable for operation of personal computers. Many companies are in the business of creating and publishing computer software packages which are then marketed to personal computer owners for use in their machines. Typically such computer software packages are marketed on a fixed fee basis in which a user purchases a copy of the software, usually under terms of a written license, for a fixed price thereby granting to the user perpetual use of the software. It has been a characteristic of this industry that in order for the publishers of the software to recover the often quite large investment in research and development of the software, and also the costs of manufacture and marketing, that the purchase price of many such software items has been relatively high, particularly for limited distribution or special-purpose software. This high purchase price has been a barrier, in some circumstances, to the widespread sale of some software and has limited the penetration of software publishers in some markets. In addition, some users are reluctant to incur such a purchase price without first operating the software, since the suitability of software is very difficult to judge without actually using it.

The relatively high purchase price of software has lead to another phenomenon perceived as a problem by many software publishers. It is often relatively easy for a personal computer owner to make duplicate copies of any software which the owner has purchased unless the software is in some fashion protected from such copying. It has become quite common for some personal computer owners to make and disseminate such copies to their friends and acquaintances. This often widespread unauthorized copying dilutes the market for the software product and may cause the publisher to ask even a higher price for each legitimate copy of the product in order to ensure a reasonable amount of return.

One solution to this dilemma has been for manufacturers to institute copy protection schemes which are intended to allow media carrying personal computer software to be sold with the media containing technical devices intended to ensure that unauthorized copies cannot be made on personal computers. Copy protection schemes were put into place by a variety of companies using various techniques. One technique was to use a non-standard format for the magnetic disk on which the program was stored, with the non-standard format not being copyable given the operating system for the personal computer for which the program was intended. A second technique which was used was to introduce limited format error or an altered physical characteristic into the disk which the computer is unable to duplicate when copying the disk. Special commands in the program would then check for that identifying information before allowing operation of any programs on the disk and thus to ensure that the disk was not a copy. It has been a more recent trend that a third category of software protection schemes have been proposed which involve physical protection either by making physical variances in the disk which must be checked by the program before it can operate or by requiring hardware devices, known as "locks," which must be purchased along with the software in order to operate it. All such copy protection schemes have suffered from some disadvantages in that the technique of protection of many of the schemes have been deduced by individual computer owners who then widely publish how the copying protection scheme may be avoided. Certain programs are also sold commercially which enable the copying of certain disks which are otherwise intended to be copy protected. Hardware based systems can also be avoided by the custom creation of hardware devices which can emulate the lock intended to be sold with the system.

It is also generally known in the prior art that computer programs can be encrypted or encoded so that they must be used with a special microprocessor or other unique hardware having the capacity to decrypt or decode the program. Such systems are limited to the particular encryption/decryption system hard-wired into the computer and thus are vulnerable to unauthorized use once the methodology of the system is deduced once by a user.

SUMMARY OF THE INVENTION

The present invention is summarized in that a billing system for the distribution of personal computer software includes a security module which may be installed in the personal computer of the user; a billing module which may be installed and removed from the expansion module contained in the computer and which contains therein suitable memory location for the writing and reading of billing information; and at least two programs on a memory media deliverable to the user, one program being a security program and the other program being an enciphered application program, the security program serving to interrogate the security module and the billing module to determine the codes therefrom, using that information to generate a decipher algorithm and using that decipher algorithm to decipher the application program which may then be operated by the personal computer.

It is an object of the present invention to provide a security and billing system for personal computers which allows users to make an unlimited number of copies of the program without endangering the overall program security or the appropriate return of income to the software publisher.

It is yet another object of the present invention to provide a software dissemination and billing system which allows for users to obtain access to personal computer software on a pay-per-usage basis so that software can be evaluated, tested, and used without a large initial investment in the software package while still ensuring a return of income to the software creators for actual use of the software.

It is yet another object of the present invention to provide a security system for software distributed in such a billing system such that the billing system is extremely difficult to evade.

Other objects, features, and advantages of the present invention will become apparent from the following specification when taken in conjunction with the accompanying drawings.

BRIEF DESCRIPTION OF THE DRAWING FIGURES

DESCRIPTION OF THE PREFERRED EMBODIMENT

The invention disclosed herein can be conceptualized as having a minimum basic system for software security and billing and a series of additional options or features which may be added thereto. The additional options and features on this system may either increase the desirability of the system from a commercial viewpoint or enhance the security of the system, and may be added individually or in groups to the basic system. Some of the options and enhancements are likely to be used in an actual commercial embodiment of this invention. However, in order to understand the concept of the present invention most fully, it is first necessary to understand what the basic core concept contained herein is. Accordingly, it is first necessary to examine the simplest possible system constructed in accordance with the present invention.

Figure 1:
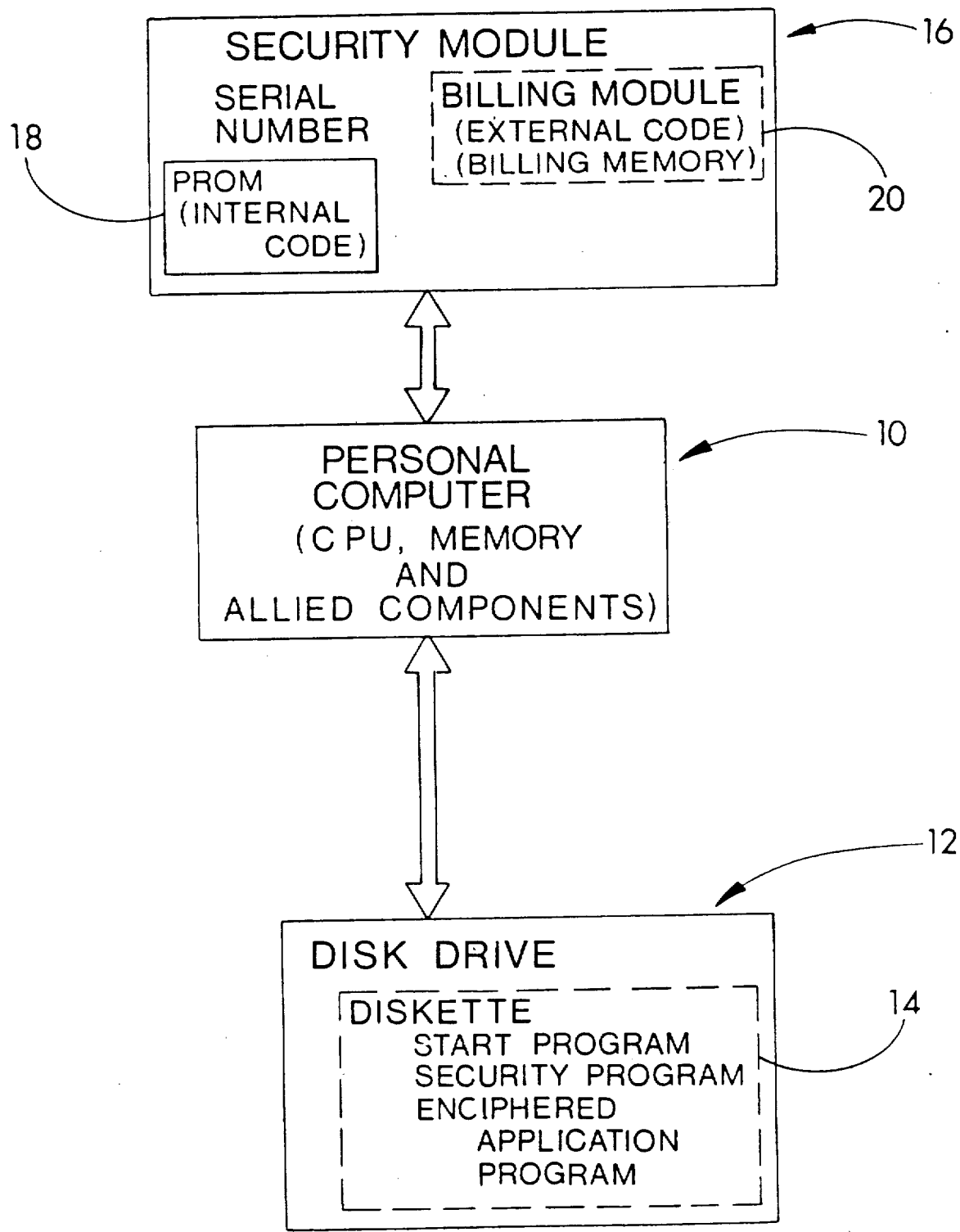
FIG. 1 is a schematic illustration of a billing system constructed in accordance with the present invention.

A basic computer software security and billing system according to the present invention is illustrated by the block diagram of FIG. 1 as used in a personal computer. A personal computer, having a central processing unit (CPU), resident memory, input/output interfaces, and other related circuitry, is generally indicated at 10 and is otherwise conventional and well-known in the art. The computer CPU and memory unit would normally include one or more media on which computer software programs can be stored, typically a disk drive, such as that generally indicated at 12 in FIG. 1. While the present invention is particularly described with regard to a conventional magnetic disk media currently as is used in personal computers, it is to be understood that it is equally applicable to other permanent memory media such as magnetic cartridge, optical disk, rom chip, etc. In the embodiment of FIG. 1, the conventional disk drive 12 may be loaded with an appropriately formatted magnetic diskette 14 containing thereon programs to be utilized by the user. The diskette 14 is a conventional diskette in its physical make-up, although the programs carried on it will be somewhat unique as will be discussed below. The unique hardware required by the present system is a security module generally indicated at 16. The security module 16 is a hard-wired logic circuit electronically attached to the personal computer 10. The security module 16 may be constructed as an expansion card which can be inserted into the chassis of a personal computer having a so-called "open" architecture. The security module may also be a stand-alone accessory to the main computer which is attached to the computer by an appropriate serial or parallel port. The method of communication, i.e., whether it is parallel or serial, between the main computer and the security module 16 is unimportant as long as there are address and bi-directional data paths for information to be transferred between the security module 16 and the personal computer 10.

Within the security module 16 is located at least one fixed memory device 18, preferably a PROM or programmable read-only memory. Other fixed memory devices than a PROM may also be used within the scope of the present invention as long as the device used is capable of holding fixed numerical information of the type required here. The PROM 18 in the security module carries thereon a fixed pre-selected numerical code, referred to here as an internal code. The internal code is unique to each individual security module 16. The security module 16 also may carry elsewhere there on it a serial number also unique to the security module 16. The serial number on the security module 16, which is usually not the same in numerical value as the internal code carried in the PROM, is preferably fixed in both electrical form (such as in a PROM or switch settings) and in human readable form so that security modules 16 can be matched with appropriate internal codes.

Also carried on the security module 16, when it is in use, is a billing module 20. The billing module 20 is a removable memory device which can be inserted into a previously provided access interface on the security module 16. In other words, the billing module 20 is a removable memory module which can be easily removed from and inserted into the security module 16. The billing module 16 must have a memory portion which can be read by the computer 10 through the security module and written thereon. Accordingly, the exact media of the billing module can be varied within the scope of the present invention. Many media can be used for the billing module 20 based on magnetic, electronic, optical or even physical data storage technologies. A suitable medium might include a paper card having a magnetic memory portion thereon which can be inserted in a read/write interface provided on the security module 16. For example, the security module 16 could be a stand-alone accessory to a personal computer and could have a simple card slot into which a paper card carrying a magnetic strip thereon is inserted with the magnetic strip serving as the billing module 20. It is the preferred embodiment of the billing module in the present invention, however, that the billing module 20 consist of an EEPROM. An EEPROM is an electrically alterable and erasable programmable read only memory. Preferably the EEPROM billing module 20 is encapsulized in such a fashion that it is easy to handle by a user and is designed to interface with a simple mechanical and electrical interface provided on the security module 16 into which the billing module 20 can be inserted.

While the billing module may often be removable, it is also envisioned that in some variations, the billing module might not be removable. In one such variation, the billing module could be connected through a modem to be updated and read for billing purposes by telephone. Another possibility is that the billing module could be connected to appropriate circuitry to be updated by fixed wire or by radio signal. It is also possible for the billing module to be located some distance from the computer, for example at a different station in a local area network where it could be polled and updated as needed and could be used by a number of personal computers.

The billing module 20, of whatever media it is contructed, has at least two portions of memory thereon.

The first memory portion carries a numerical value referred to here as an external code. The second portion of the billing module memory consists of billing memory. The external code is a number designed by the computer to be read from the billing module 20. There may be more than one external code and the external code may consist of more than one portion or part. The billing memory is intended to store billing information which may be data previously loaded onto the billing module 20 or may be a blank area on the billing module 20 onto which information may be written. In either event, it is critical to the present invention that the billing memory portion of the billing module 20 be alterable by the computer 10 in accordance with information received and processed by it. It is therefore also possible that the billing module itself could be embodied in a removable magnetic storage media, such as a floppy diskette, which could have an area onto which the external code was pre-recorded and a separate portion into which billing information is loaded.

The application diskette 14 for use within the present invention carries thereon at least one computer program which the user desires to operate. This is referred to herein as the "application" program. In accordance with the present invention, the application program is enciphered in accordance with an algorithm driven by a numerical key, as will be discussed in more detail. The diskette 14 therefore carries the application program in its enciphered form. The diskette 14 also carries an unenciphered start program. In addition, the diskette 14 also carries a security program which may or may not be enciphered depending on the level of redundant security desired in the embodiment of the present invention. If the security program is not enciphered, then the start program may merely be a portion of the security program.

In its operation, the basic system illustrated in FIG. 1 is intended to operate as follows. The computer 10 is operated in a normal fashion and the diskette 14 carrying the enciphered application program which the user desires to operate is loaded into the computer disk drive 12. As is conventional, the computer CPU loads the program from a previously designated portion of the diskette 14. Carried on that previously designated portion of the diskette 14 is the unenciphered start program which is thus loaded into the resident memory in the computer 10. The start program then operates. In its most basic embodiment, the first thing that the start program does is verify the presence of the security module carrying an active billing module in it. The start program also verifies from the billing module that the user still has billing credit to operate the program before it will proceed. Assuming that the billing module is present, and billing credit is available to the user, the security program is run. The security program reads the external code from the billing module 20. This code serves as a "key" to a previously selected algorithm utilized by the security program. No single particular algorithm is to be used for the enciphering and deciphering of all application programs. In fact, it is intended that different algorithms be used on different diskettes 14, as long as the security program on any diskette corresponds to the algorithm used to encipher the application program on the diskette. Each algorithm so used is preferably based on a numeric key so that the same key must be available to decipher the program as was used to encipher it, although it would also be possible to use a two key system in which the encoding key is different from the decoding key. Thus the algorithm used by the security program is the inverse of the algorithm used to encipher the application program. The security program uses the key from the external code to operate a deciphering algorithm to decipher the enciphered application program. The security program may decipher the entire application program, or may only decipher one or more modules of the application program which are to be used by the user at one time, or may decipher only a small number of very important program instructions addresses or locations. The security program may also shift a small number of mislocated instructions. The security program then turns over execution to the application program which thereby proceeds to execute for the user.

As the application program executes, the security program periodically monitors application program execution. This can be done by formatting the application program as a routine called by the security program with program execution periodically returned to the security program or alternatively may be accomplished through one or more interrupts by which the security program interrupts operation of the application program. In any event, during this periodic process, the security program verifies continued use of the application program within the computer, and assuming that use is continuing, the security program then creates billing data based on program usage. The billing data is stored on the diskette 14 at very frequent intervals and is then periodically written into the billing information area of the billing module 20. There are generally two approaches for entering billing information in the billing module 20. In one approach, the billing memory of the billing module 20 is provided with a pre-established authorization of a certain amount which is loaded into the billing memory of the billing module 20 before it is supplied to the user. In this variation, the security program would then decrease, or decrement, the value of the billing credit authorization contained in the billing memory as use of the application program continued. In the second approach in which credit is extended to the user, the security program would note when the application program execution continues, and write information onto the billing memory indicating usage by the user. This approach would be to increment the billing memory by adding additional information thereto. Regardless of whether a decremental or incremental system is used conveying billing information to the billing memory, the billing can be done on a time basis or can alternatively be done by monitoring any type of operation by the application program, such as disk access or reloading of different modules, which is generally indicative of the amount of use of the application program which is being enjoyed by the user.

This system, in its simplest variation as described, conditions the users access to the application program on the presence of a properly matched billing module 20 which must also have billing authorization on it. The billing module 20 must be matched to the diskette 14 in the sense that the application program on the diskette is encoded by an algorithm the key to which is derived from the external code on the billing module 20. The numeric decipher key is thus unique to the user, although the encipher/decipher algorithm may vary from diskette to diskette. This system is the easiest to implement and maintain. Users could return the billing module 20, usually by mail to the dealer or billing center for additional usage authorization when the limit set in the billing module 20 is reached. Alternatively, the billing modules 20 could be read and reloaded via modern hook-up. Thus users could be charged only for the usage they make of the software. In addition, since the codes can be changed periodically, permanent breach of the security of the system is unlikely.

The first level of additional sophistication and security to be added to this basic system is to make use of the internal code in the PROM 18 in the security module. The decipher key used in the algorithm by the security program would then not be simply derived from the external code but would be derived from both the internal and external codes. This derivation of the decipher key could be relatively simple, such as simple addition of the internal and external codes, or could also be a more complex relationship. Thus the security program would first derive the decipher key, by whatever method was selected, and then use that key in the algorithm to decipher the application program.

The effect of this enhancement to the system is to create additional security. The user cannot evade the security of the system simply by learning the external code. By requiring the internal and external codes to be combined, the chances of a user gaining access to both codes is reduced and the system is very difficult to crack. Furthermore transfer of the billing module to an unauthorized computer is prevented.

These simplest and most basic variations in this system provides significant security to the software creator and distributor. The external code and internal code are unique to any individual user and thus the enciphered application program on the diskette 14 may only be successfully used by the single user who has validly obtained a security module 16 and an appropriate billing module 20 for use with that specific individual security module 20. Thus for use with a diskette 14 it is not required that any form of copy protection be employed, since the user can make simply as many copies as he may desire. Each of these copies will be useless to the user, however, unless it is used in conjunction with the security module 16 containing an appropriate billing module 20 therein. Extra copies of the enciphered application program will not allow the user to run the program and there is therefore no benefit to him. The security of the system is inherently difficult to break because of the fact that the internal code in the PROM 18 in the security module and in the external code of the billing module 20 are previously selected and unique to each individual computer. Therefore if one user of software distributed in this fashion should uncover the algorithm used by a particular security program, and the internal and external codes used with a particular security module 16 and billing module 20 for a program that he has in his possesion, that information will not be sufficient for another user to evade system security since the code will be different. In addition, various versions of the security program can be used, each utilizing a different algorithm for the enciphering and deciphering process. In this way, multiple levels of security are provided without the necessity for copy protection.

An additional method for monitoring any non-compliance with the security features of the system of the presence is to individualize each legitimately sold diskette 14. The diskettes 14 could be provided with individual hidden serial numbers or with individualized non-functional program-like character sequences. If this option is used, and the security is breached, at least the breach can be traced back to the diskette from which non-secure copies were made to facilitate remedial action.

In addition, users can be billed on a charge per-use basis in any easy fashion. Using a decremental billing system, the user can purchase a billing module 20 from his software supplier containing a pre-authorization of a certain amount of usage. He then takes the billing module 20 home, and takes the program disk 14 enciphered to match his billing module 20 home with him and operates the program as he desires. If the user exceeds the amount of authorization contained in the billing module, program execution stops. If the user decides he requires no further use of the program, he returns it to his vendor and is given credit for the remaining authorization contained in the billing module which he returns to his dealer. Alternatively, for customers who are creditworthy, the billing modules can be issued to them on a credit basis. Again a specific billing module 20 has to match a diskette containing an application program enciphered by an algorithm whose decipher key matches the external code in the billing module 20. The user can take the program home, operate it as desired, and returning the billing module periodically to the supplier for reading. The supplier can then bill the user for his use. Under such a system, the billing module would be replaced periodically by the supplier, typically on some kind of fixed time period basis, such as monthly. The transaction could occur by mail, particularly if the billing module consists of an EEPROM, which can easily be mailed to the supplier and back to the user each month, so that the user always has a billing module operable in his system. Another alternative is for the billing module to be read remotely by a billing facility. A modem and suitable software could allow the computer 10 to be remotely accessed by telephone so that the central facility could read billing information on the billing module 20 to charge the user.

As can be seen from the foregoing discussion, the present invention is not dependent on any particular algorithm. In fact the system is operable with quite a variation in the type of algorithm used for the encrypting as long as the appropriately encrypted algorithm is used with the appropriate de-encrypting security program on the disk and further as long as the encryption and decryption are keyed by the same numeric key. Since the disk is supplied with both the enciphered application program and the security program intended to do the de-enciphering, the information actually physically in the computer, consisting of the codes and billing information in the billing module and on the security module is, in essence, independent of the encryption algorithm used on the program which is used with it.

To better understand the present invention it is helpful to consider an example of a simple method for deciphering an application program. This simple example uses relatively short codes. In practice, a more complex algorithm methodology and longer codes would be used to add to system security.

As is made clear from the discussion above, the enciphering or deciphering procedure of the present invention is driven by a numerical code, referred to as the decipher key. The enciphering key is chosen at random and used in the algorithm to create the enciphered program. Therefore the first step in the deciphering procedure is to derive or create the appropriate deciphering key corresponding to the enciphering key used for the program in question. To develop the deciphering key, the security program would read the code contained in the billing module 20 of the security module 16, known as the external code. This external code would then be added to the internal code contained in the PROM 18 permanently mounted in the security module 16. These two codes would also be operated on by the disk code which would be resident on the applications diskette 14 which is desired to be operated by the system. Since the enciphering key was chosen at random, and since the internal code contained in the security module 16 is fixed, the external code contained in the billing module 20 and the disk code contained in the diskette 14 must be properly selected so that the operation of the algorithm on all these codes yields the appropriate deciphering key. In the example here, where the algorithm consists of simple addition, the three codes may simply be added through normal binary addition as follows.

| External Code | 1010 |
|---|---|
| Internal Code | 1001 |
| Disk Code | +10110 |
| Deciphering Key | 101001 |

This step yields a numerical value for the deciphering key which then may be used as the key to the deciphering algorithm. Obviously the length of the codes may vary from application to application and the size of the various three code components may also vary with respect to each other.

Once the deciphering key has been derived using this procedure, the deciphering key may then be used to decipher the program in segments. The deciphering key is used repetitively and applied to the enciphered program code in a method determined by the algorithm. Again, for purposes of this discussion, we will assume that the algorithm of deciphering is simple repetitive logical addition of the deciphering key to the bits of the enciphered program text. That procedure would proceed as follows:

| Enciphered Program Text | 101110 010101 |
|---|---|
| Repeating Deciphering Key | +1010001 101001 |
| Deciphered Program Text | [1]010111 111110 |

The numeral in brackets above, [1], is the carry-forward.

The deciphered program text would be loaded into a portion of computer memory to which operation of the program can be transfered in an appropriate step in the security program. The deciphered application program text would constitute the actual instructions to be operated by the computer during the application program. For the above simple deciphering procedure, the enciphering program would be the reverse procedure in which the enciphering key would be subtracted from the unenciphered program text to create the enciphered program text.

In one variation of the procedure of the present invention, it may be desirable to add additional security by enciphering the disk code as well. If this was done, the codes from the internal and external codes would first be added to create a code that would be used as a key in deciphering the disk code itself. Then the disk code would be added to the internal and external codes to create the deciphering key for the program text itself.

It is also possible that certain important numbers to the operation of the software, such as program addresses or the locations of certain program instructions within the address itself, or as to the relative location of information on certain sectors of the floppy disk, may be individually enciphered. In fact, if such addresses are contained within the text of the actual program itself, it may be possible to encipher them within the plain program text and then encipher the entire program text so that those particular key addresses or location numbers are doubly enciphered. To decipher such doubly enciphered numbers would simply be the reverse procedure in which the entire program text is first deciphered and then individual predetermined key addresses or location numbers would then be de-enciphered.

Within this general scheme, the algorithms both for generating the deciphering key and for deciphering the program text can be varied enormously. While arithmetic or algebraic algorithms are preferred, other algorithms of varying degrees of simplicity or complexity can also be utilized. For example, in creating the deciphering key, rather than adding the various codes together, they could be placed sequentially in binary fashion to create a long numerical value which could be used as the deciphering key. The algorithm for deciphering the program text could involve shifting of data by bit position, or in predetermined unit sizes which may or may not correspond to standard byte length instructions, as long as the methodology and timing of the shifts of data is consistent in such a fashion such that deciphering is appropriately available. In other words, the term "deciphering" as used here is not limited just to encoding of letters, terms or character sequences, but refers to any rearrangement of the application program, or its code, which prevents effective operation of the program in its enciphered form, which is based on an enciphering and deciphering key, and which is reliably decipherable with the key. For example, it is possible to have enciphering routines which would call for the relocation or rotation of various code or instruction sequences around the program. It is also possible that program segments could be distributed around the diskette 14 in such a fashion that the segments have to be re-ordered to function, and the method of this reordering can be determined by such an algorithm. Again, all these variations would have to be done in a methodology that is consistent so that the deciphering program could unscramble the disrupted sequence of instructions to properly read and execute the application's program.

Figure 2:
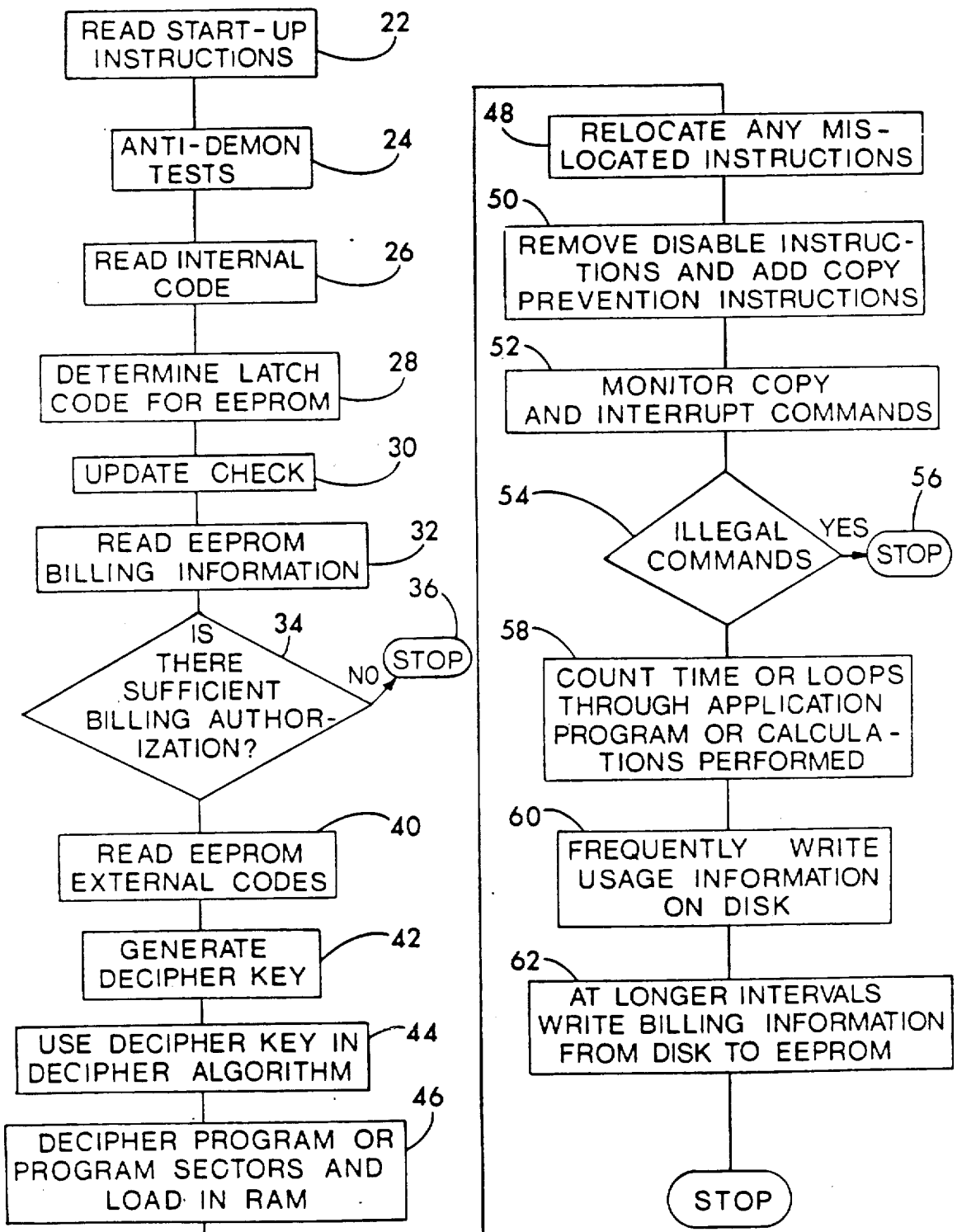
FIG. 2 is a flow chart diagram of a method of operating a billing and security system in accordance with the present invention.

Shown in FIG. 2 is a flow chart generally illustrating the procedural steps which would have to be followed by the start program and the security program to properly operate an application program in accordance with the present invention. The start program and the security program can be considered as one program if the security program is unenciphered. In some variations of the present invention it may be desirable to encipher the security program which is then deciphered by the start program. For purposes of this illustration, the security program will be unenciphered and the two programs will be referred to together, as they are illustrated as one flow-chart in FIG. 2. The program is first loaded from the disk and that program begins with a step of reading the startup instructions as indicated by reference numeral 22. The program then performs a series anti-demon tests as indicated by program step number 24. A demon is a program or hardware implemented in a personal computer to watch for tests of copy protection identification and then to provide simulated proper identification response, even if the program is an illegal copy. Demons are generally placed in RAM memory although theoretically it is possible to create such demons resident in an interal ROM memory. This program step 24 is simply intended to test for the presence of those devices so as to avoid them or avoid operation in their presence as appropriate. Step number 26 in the operation of the program is to read information from the PROM 18 located on the security module 16. This information would include the internal code carried on the PROM 18 and might also include the hard-wired serial number carried on the security module 16. The information read from the PROM is then utilized to generate a latch code to be presented to the EEPROM which is the billing module 20. It is preferred that the EEPROM billing module 20 have a latch mechanism whereby a proper latch code must be presented to the EEPROM 20 to gain access to it, and this step is to generate that code. Program step number 28 indicates that this calculation occurs and that the latch code is presented to the EEPROM to enable reading and writing on the EEPROM. The first step in reading from the EEPROM occurs at step number 30 where an update check is made as to billing memory locations within the billing module 20 itself. The update check 30, a system option, would have the program examine predetermined locations in billing module 20 memory to see the current update, or release, status of the software. Because the application program, or the security program, may be updated periodically, and because the billing module 20 is periodically replaced, information placed in the billing module 20 about updates in the application program can be read at this point. The update information can be used to inform the user or to prevent further system operation if the supplier wants to ensure all program copies are updated. In other words the systems program would stop execution of the program if the information on the billing module indicates that this version of the security program is obsolete. At step number 32, the appropriate billing authorization information is read from the EEPROM of the billing module 20 so that the program can evaluate the billing information. At decisional step number 34 the billing authorization information obtained from the billing module 20 is analyzed to determine if the billing module is full or if the credit limit has been exceeded. If either condition is true such that there is no longer sufficient authorization to the user to utilize the application program, then the program proceeds directly to a stop at 36. If the billing module still contains current credit or authorization for the user's use of the application program, then the process can proceed. The next step 40 commences a procedure which is more logically a part of the security program if it is separate from the start program, although the boundary between the two can be to some degree definitional. The program which has now gained access to the EEPROM billing module 20 reads from the EEPROM the external code or codes to be utilized in the deciphering algorithm. At the next step 42 the program uses the internal and external codes, together with the disk code read from the diskette 14, to generate the decipher key. The decipher key, as referred to earlier, is a numeric value to be used as the key in the enciphering and deciphering algorithm for the application program. The program then proceeds to step 44 wherein the key is implemented in the deciphering and locating algorithm. The algorithm is operative both to decipher segments of program code so as to create plain unenciphered computer program text out of enciphered text, and may also be used as a locating mechanism to unscramble various program segments placed in a scrambled fashion in various locations on the diskette 14. The program then proceeds in step 44 to decipher the various program sectors and assemble in RAM the resulting deciphered program text in its proper order for proper execution of the application program.

It is also possible that within the actual deciphered application program there may have been deliberately mislocated instructions as part of the enciphering and security process in creating the enciphered application program. If this option is used within the structure of the present system, the location and relocation of those mislocated instructions is determined by the internal and external codes which are again utilized to generate a key which determines the placement of the misplaced program instructions. If this option is utilized within the present invention, a program step 48 is then necessary at this point to relocate any such mislocated instructions and to relocate them in proper fashion in resident memory so that the application program can properly execute. Also as an additional optional security feature within the present invention, the program would remove disable instructions and add copy prevent instructions to the operating system or other resident instructions contained in the personal computer to prevent disruption of the operation of the application program in any manner which is not intended. A related procedure may be implemented at 52 in which copy or interrupt commands are evaluated to determine if they are appropriate or not. If step 52 is implemented, then each copy or interrupt command is evaluated to determine whether or not it is appropriate, as a logical step 54, and if it is determined that a command is inappropriate, then the program stops executing at 56.

If the user does operate the system correctly, the application program would then execute. While the application program is executing, it is still necessary for the security program to maintain overall control of the program execution and to monitor its execution. This security program would, as indicated by step 58, measure usage of the application program. This measurement could be done by simple counting time of operation of the application program or alternatively could be done through measurement of certain loops through program operation or measurement of the number of calculations performed, depending on the billing strategy of the application program publisher and on the purpose of application program itself. At periodic intervals, when it is determined that an appropriate billing milestone has been passed, the security program would then proceed to step 60 at which it would write application program usage information on the diskette 14 on which the application program is carried. This writing of billing information onto the diskette, or hard disk if a hard disk is utilized, should be done relatively frequently, perhaps every thirty seconds or once a minute. At the same time, it is preferable that the previous written number could be read and compared to records resident in memory to ensure that there has been no alternation of the billing sequence such as might occur if the computer was turned off or if an attempt was made to alter the billing information on the system. At a longer periodic basis, perhaps at intervals of fifteen minutes to a half hour of elapsed time, the security program would then have to write billing information onto the billing module 20 itself at step 62. This information could be done in two ways. If the billing module receives additive information, then the program would write affirmative data onto the billing module in the billing memory portion thereof. If the billing module is provided with a pre-set amount of authorization, then at step 62 a subtraction from that authorization would be made leaving a new balance which represents the remaining credit allowable to the user. The program would then test for billing authority to determine that there is still sufficient billing authority in the billing module for the user to proceed. If not the program would immediately stop. If the billing authority does exist, then execution of the program could proceed until terminated by the user.

It may be desirable to enhance the security of the transfer of data relating to usage. If this is desired, when the usage data is in computer RAM memory a check sum is generated from the usage data and both the usage data and the check sum are encoded. The encoded numbers are then written to disk. Data transfer between the disk and the billing module can be similarly protected by encoding.

It may also be desirable to have additional anti-demon tests or other tests for security evasion located at various parts of the security program to ensure that deception of the overall security operation of the system is not impaired.

Another option within the present system is to insert validation numbers, which would be sequential or encoded numerical values, which could be written by the system from the billing module or onto the diskette 14. The system would then always check to make sure that a proper validation number is resident in the billing module at various times in the program to ensure that no unauthorized interruption of the system has occurred or improper usage thereof. For example, each billing module might contain a validation number which can be derived from the next-precedent validation number. In this way, if the system tests for either the same or next validation number, use of an unauthorized billing module is prevented, although this level of security may be seen as redundant. Alternatively, the validation number could be generated from a measure of program usage to ensure that the billing module is changed periodically. The most preferred method for the validation number to function is that the validation number, in enciphered form, would be transferred from the billing module to the disk containing the application program. When the billing module is changed, a validation key is read from the new billing module and used to decipher the enciphered validation number from the previous billing module. The deciphered validation number is compared to the expected value before application program execution can proceed. Other similar variations and modifications are possible within the scope of the present invention to add further redundant security to the system.

For example, in another, more sophisticated, version of the present invention the security module itself could be provided with a security module microprocessor connected directly both to the PROM in the security module and the EEPROM in the billing module. The security module microprocessor is capable of enciphering and deciphering data transfers between the billing module and the main microprocessor or the disk. The security module microprocessor would generate the deciphering key, through a unique routine carried in either the PROM in the security module or in the billing module. The program usage or billing information would also be transferred directly to the security module microprocessor where it is accumulated for periodic transfer to the billing module.

An enhancement of this microprocessor-equipped security module would be that this security module could service more than one personal computer. For large organizations, such as corporations, with many personal computers connected in a local-area-network, or LAN, it would be possible for a single processor, designated a billing concentrator, to poll the billing modules of the computers on the network to read off the billing information from each node in the system. The billing concentrator would communicate billing information, perhaps by modem, with the central billing authority. For this option to be effective, microprocessors are necessary in the security modules to be able to communicate with the billing concentrator.

It is understood that the invention is not confined to the particular construction and arrangement of parts herein illustrated and described, but embraces such modified forms thereof as come within the scope of the following claims.

I claim:

1. A billing system for billing users on a usage basis for an enciphered application software program for a computer comprising:
    a hardware security module attached to the computer, the security module carrying therein a fixed computer-readable numeric internal code and also carrying a billing module interface;
    a billing module electrically connected to the security module and electrically connecting to the billing module interface therein, the billing module having fixed and alterable memory therein with a fixed computer-readable numeric external code in the fixed memory and billing information stored in the alterable memory, and
    a storage medium for the computer carrying an enciphered application program thereon and also carrying thereon security program means for (1) causing the computer to read the internal code and the external code, (2) using the internal and external codes to generate a decipher key which is used in a predetermined algorithm to decipher the application program for use by the user, and (3) writing usage billing information in the alterable memory in the billing module.

2. A billing system as claimed in claim 1 wherein the security program means reads billing authorization information from the billing module before deciphering the application program and wherein the security program means will not decipher the application program if the billing authorization is insufficient.

3. A billing system as claimed in claim 2 wherein a pre-established billing authorization amount is stored in the billing module and the security program means writes usage billing information in the billing module by decrementing the authorization amount based on usage.

4. A billing system as claimed in claim 2 wherein a pre-established authorization limit on the amount of memory of the billing memory set aside for billing information is established and wherein the security program means writes billing information in that memory until the authorization limit is reached.

5. A billing system as claimed in claim 1 wherein the security module includes both resident read-only memory and the microprocessor, the security module connecting to the billing module and controlling interactions and communications between the computer and the storage medium and the billing module.

* * * * *